March 18, 1969     G. W. BERNHEIM     3,433,967
PHOTOELECTRIC SWITCH ADAPTER FOR LANTERN
Filed Feb. 15, 1967
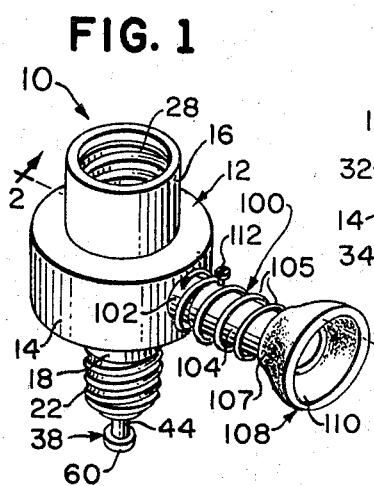
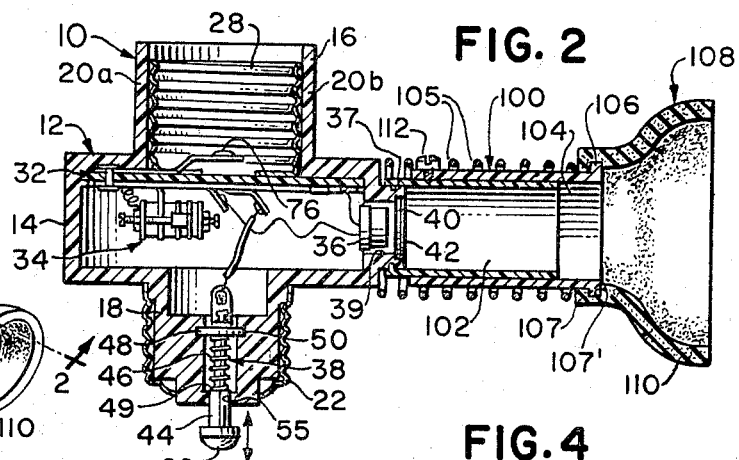
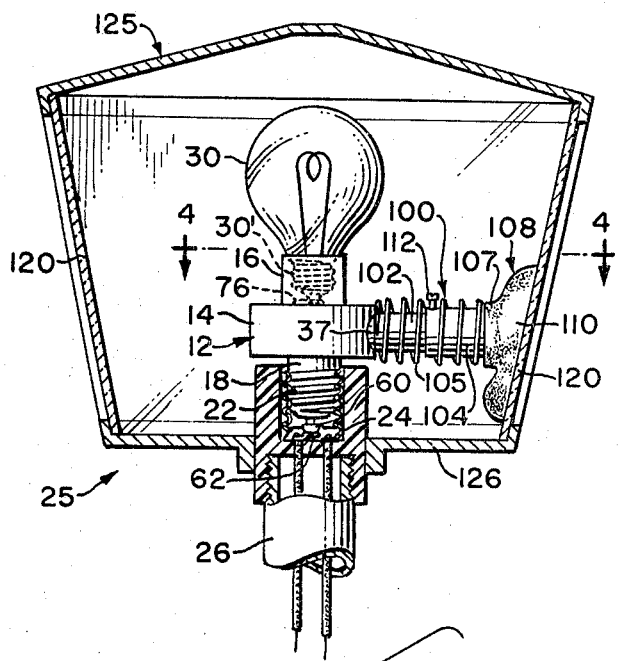
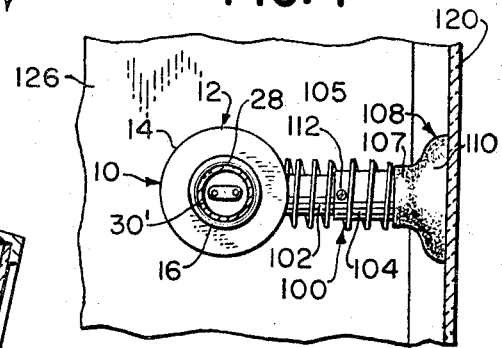
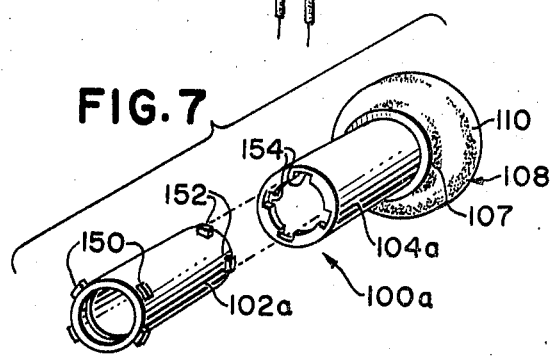
INVENTOR:
GEORGE W. BERNHEIM
BY J. B. Burke
ATTORNEY.

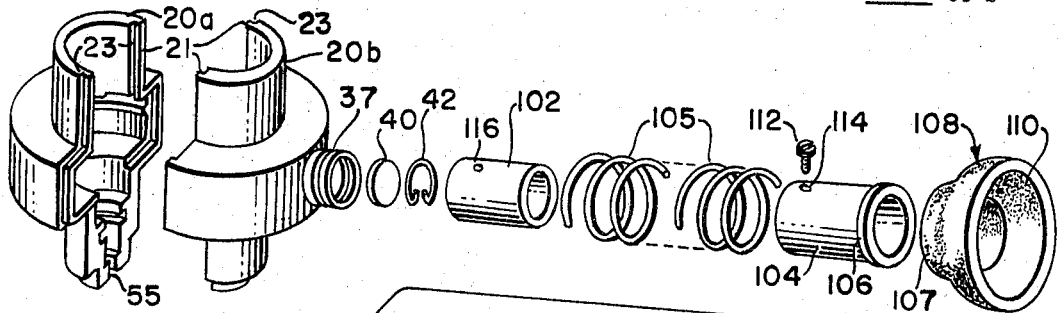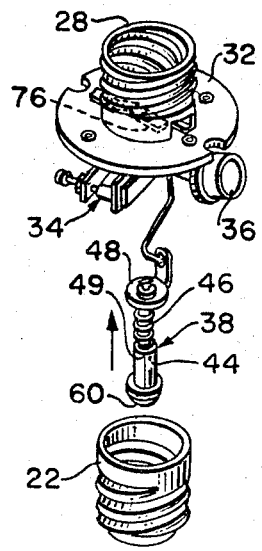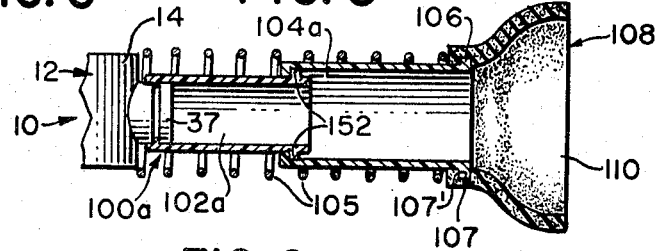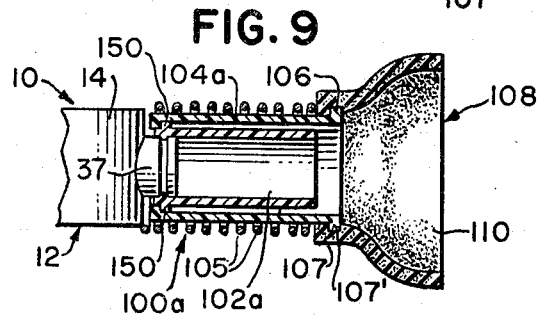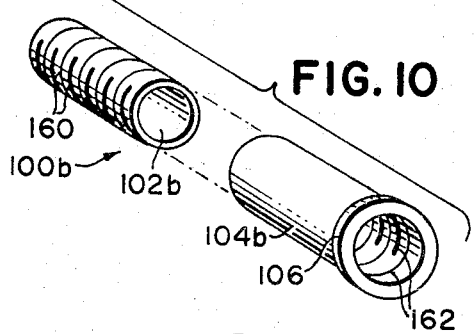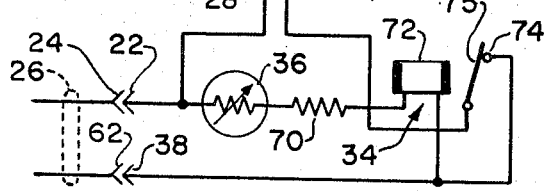

United States Patent Office 3,433,967
Patented Mar. 18, 1969

3,433,967
PHOTOELECTRIC SWITCH ADAPTER FOR LANTERN
George W. Bernheim, P.O. Box 52,
Riverdale, N.Y. 10471
Filed Feb. 15, 1967, Ser. No. 616,296
U.S. Cl. 250—239
Int. Cl. H01j 5/16, 39/12
10 Claims

ABSTRACT OF THE DISCLOSURE

The disclosure describes a photoelectric switch adapter which supports a lamp bulb in a lantern. The adapter is rotatable in the lantern to different positions for optimum orientation of a photoelectric cell in the adapter. The adapter is provided with a telescopic optical tube for admitting ambient light to the photoelectric cell while excluding light from the lamp bulb. The tube has a resilient end to accommodate to different sizes of lantern globes and different shapes of lantern walls. Several different mechanical arrangements for axial adjustment of the tube are described. The adapter has a spring biased tip which permits rotational adjustment of the adapter in the lantern while maintaining electrical continuity with the lantern.

---

The invention concerns improvements in a photoelectric switch adapter of the general type described in my prior U.S. Patents 3,056,035 and 3,163,768, for supporting a lamp bulb in a lantern and operative to turn the lamp light off automatically at dawn and on at dusk. In Patent 3,056,035 I described an adapter having a housing with three mutually rotatable parts. In Patent 3,163,768 I described an adapter having a housing with two mutually rotatable parts. In the present invention I provide a housing of simplified construction. It has no major rotatable parts. The housing is made of two attached half sections. In Patent 3,056,035, a photoelectric cell in the housing is exposed to ambient light but shielded from the light of the lamp controlled by the adapter, by a single upstanding plate. In Patent 3,163,768 the shield is a funnel shaped member surrounding the neck of the lamp bulb. I have found that both types of shields are not wholly effective in lanterns having an outer globe or lantern reflector spaced an inch or more from the photoelectric cell in the adapter. Because of this spacing, light from the lamp bulb supported by the adapter is reflected from the globe to the photoelectric cell and this interferes with proper operation of the adapter switching circuit.

According to the present invention, there is provided a telescopic optical tube which extends from the adapter housing containing the photoelectric cell, radially outward to the lantern globe. The tube is axially adjustable in length to accommodate to different sizes of lantern globes and different shapes of lantern walls. The tube has a resilient cup at its outer end which conforms to any shape of wall of the lantern globe. The cup compensates for angular inclinations of the lantern globe to the axis of the telescopic tube, and adjusts for any angular position of the telescopic tube with respect to the wall of the globe.

The adapter is provided with an improved spring biased retracting tip to maintain positive electric contact with a lamp socket in the lantern while permitting rotational adjustment and positioning of the adapter in the lantern.

It is therefore a principal object of the invention to provide a photoelectric switch adapter for a lantern with a telescopic tube to shield a photoelectric cell in the adapter from light emitted by a lamp bulb carried by and controlled by the adapter.

A further object is to provide a photoelectric switch adapter as described, wherein the telescopic tube has a resilient end to conform to different shapes and positions of lantern globe wall.

Another object is to provide a photoelectric switch adapter with a housing made of two similar half sections.

Another object is to provide a photoelectric switch adapter as described, with a retracting spring biased tip constrained to move only axially to maintain positive electrical continuity between the adapter and a lamp socket in the lantern, while permitting rotational adjustment of the adapter, and being effective to prevent axial vibration of the adapter and to hold the adapter in any set position in the socket.

A further object is to provide a photoelectric switch adapter as described, wherein the telescopic optical tube is provided with means to keep its resilient end tightly pressed against the wall of the lantern globe, but which is arranged to permit contraction of the tube for servicing the lantern, and which has means to hold the tube in contracted position.

The invention will be described in detail in connection with the drawings, wherein:

FIG. 1 is a perspective view of the adapter with telescopic tube thereon in contracted position.

FIG. 2 is a vertical central sectional view taken on line 2—2 of FIG. 1.

FIG. 3 is a vertical sectional view taken through a lantern globe and upper part of a lantern post, with the adapter shown in operative position in the lantern globe, and with the telescopic optical tube extended.

FIG. 4 is a horizontal fragmentary sectional view taken on line 4—4 of FIG. 3, showing the adapter in plan view with the telescopic optical tube disposed axially in a vertical plane which is perpendicular to the inclined wall of the lantern globe.

FIG. 5 is a view similar to FIG. 4, showing the telescopic tube disposed axially angularly to the plane of the lantern globe wall and angularly to the vertical plane which is perpendicular to the lantern globe wall.

FIG. 6 is an exploded perspective view of the adapter and telescopic optical tube.

FIG. 7 is an exploded perspective view of another telescopic optical tube.

FIG. 8 is a sectional view similar to a part of FIG. 2, showing a telescopic tube employing the parts of FIG. 7, with the tube shown in extended position.

FIG. 9 is a sectional view similar to FIG. 8, with telescopic tube shown in contracted position.

FIG. 10 is an exploded perspective view of parts of another telescopic optical tube.

FIG. 11 is a fragmentary sectional view similar to a part of FIG. 3 showing another globe, with an adapter having a telescopic optical tube employing the parts of FIG. 10.

FIG. 12 is a diagram of an electric circuit employed in the photoelectric switch adapter.

Referring now to the drawing, the photoelectric switch adapter 10 shown in FIGS. 1–6, has a housing 12 with a cylindrical body 14 and axially aligned tubular upper and lower ends 16 and 18 smaller in diameter than body 14. The housing 12 is formed from two cylindrical half sections 20a, 20b shown in FIG. 6. The sections have interfitting ridges and grooves 21, 23 at their free edges which snap together to form a complete adapter housing. Attached to the bottom tubular end or extension 18 is a threaded shell 22 which serves as a plug engageable in a threaded socket 24 at the top of a post 26 of lantern 25; see FIG. 3.

In the upper tubular end 16 of housing 12 is threaded shell 28 which receives the threaded end 30′ of lamp bulb 30. Shell 28 mounts on a circular plastic disk 32; see FIGS. 2 and 6. The disk supports an electromagnetic relay 34, photoelectric cell 36 and plunger tip 38. Cell 36 is round and fits into a lateral opening 39 in housing body 14. This opening is formed in housing section 20b. A short tubular flange 37 extends radially outward of section 20b at opening 39. In this flange fits a blue filter disk 40 and spring clip retainer 42 for the filter disk.

Plunger tip 38 has a shaft 44 on which is a coil spring 46. The spring bears against a disk 48 at one end of shaft 44. The disk fits into a circumferential groove 50 formed internally of housing 18. Shaft 44 moves axially in hole 51 of disk 48. Spring 46 at its lower end bears on a shoulder 49 formed on shaft 44 to extend the shaft out of hole 55 in the bottom end of housing extension 18. The spring does not extend below hole 55. The diameter of the lower part of shaft 44 is almost equal to the diameter of hole 55 so that the shaft moves in hole 55 without lateral freedom or play. On the inner end of shaft 44 is secured a clip which prevents the shaft from coming out of disk 48 as the shaft is urged outwardly by spring 46. On the outer end of shaft 44 is a rounded head 60 which contacts spring contact terminal 62 inside of socket 24. The plunger tip 38 and shell 22 are connected electrically by wires in circuit C shown in FIG. 12.

In circuit C the photoelectric cell 36 is connected in series with a resistor 70 and one end of coil 72 of relay 34. Shell 22 and shell 28 are electrically connected together to one terminal of the photoelectric cell. The plunger tip 38 is connected to the other end of the relay coil and to contact 74 of the relay. Movable contact 75 of the relay is normally closed with contact 74 and is connected to central terminal 76 in the tubular end 16 of housing 12. The threaded end 30' of the lamp bulb 30 screws into shell 28, and its terminals 77, 78 contact the shell 28 and terminal 76 respectively. Power is supplied from an external source to socket 24 to provide power to the adapter at its terminals 22, 38.

During daylight hours, ambient light impinges on the photoelectric cell reducing its internal resistance to a very low magnitude. The relay coil becomes energized and contacts 74, 75 open to cut off power from lamp 30. When ambient light falls below a certain magnitude at dusk, the resistance of cell 36 increases, and the relay coil becomes deenergized. Contacts 74, 75 close and the lamp 30 becomes energized.

In order to prevent the light of the illuminated lamp bulb from reaching the photoelectric cell and rendering it highly conductive, there is provided a shield in the form of telescopic optical tube 100. The tube 100 has a first tubular section 102 which snaps onto the flange 37 or fits frictionally thereon in a light-tight detachable connection. Tube 100 has a second cylindrical section 104 which slides axially on tube section 102. A coil spring 105 on the tube bears at one end against the outer side of housing 12 and at its other end against an annular flange 106 formed on the outer end of tube section 104. Flange 106 engages cylindrical end 107 of a resilient bell or cup 108. Spring 105 bears against this end 107 of the cup. Flange 106 fits into circumferential groove 107' in cup end 107. The cup has a flaring mouth 110 which is rather soft and yielding to pressure. It will be apparent that spring 105 will tend to force tube section 104 axially outward of the housing 12 as shown in FIG. 3. In order to keep the section 104 retracted on section 102 there is provided a screw 112 seated in a hole 114 in section 104 and engageable in a recess 116 in section 102. This screw can be turned one turn or so to disengage it from tube section 102 to permit extension of section 104, while the screw remains in section 104 ready for holding the tube contracted when required.

FIGS. 3 and 4 show transparent flat wall 120 of the lantern globe 125 inclined outwardly from the supporting base plate 126 of the lantern. The axis of tube 100 is disposed in a vertical plane perpendicular to the plane of the flat wall 120. It will be noted that the extended spring holds the tube section 104 extended with cup 108 pressed against the inclined inner surface of the lantern wall. By this arrangement only ambient light can enter the tube and pass to the photoelectric cell while all light from the lighted lamp bulb 30 is excluded. The cup 108 yields readily to form a light-tight seal at wall 120 of the lantern. The diameter of the cup 108 is considerably larger than the outer end of tube section 100 so that any lamp light impinging on any of the walls of the lantern globe and internally reflected to the adapter, does not reach the photoelectric cell.

The adapter is arranged so that it can be rotated to orient the photoelectric cell in the one direction which receives ambient daylight best, preferably north light. When the adapter is installed in the lantern, it is screwed fully into socket 24, while tip 38 retracts until head 60 abuts the bottom end of the housing extension 18. Then the adapter is rotated in a reverse direction not more than one turn or less than 360°, until the axis of cell 36 is located in the optimum direction to receive ambient light. During this adjustment the tube 100 is contracted and held by screw 112. As the adapter is turned in reverse direction the spring biased tip 38 remains in firm direct electrical contact with socket contact terminal 62. It also prevents both axial vibration of the adapter and turning of the adapter away from the position set. After the adapter is located in the desired optimum position, the screw 112 can be turned to disengage from tube section 102. The tube 104 will then move axially outwardly until cup 108 contacts the inclined wall 120 of the large lantern globe and conforms thereto in light-tight sealing relationship. If it is desired to clean the lantern globe or to remove the adapter for servicing or other reasons, the outer section 104 can easily be retracted from wall 120, and held in place by reengaging screw 112 in recess 116 of section 102. This will permit the adapter to be screwed out of socket 24.

FIG. 5 shows how soft cup 108 will conform to the inside of lantern wall 120 even though the axis of the tube 100 is angularly disposed to both the plane of inclined wall 120 and to the vertical plane, perpendicular to wall 120. Thus regardless of the relative angular position of the axis of the tube and the plane of nearest wall of the lantern, the cup 180 will effect a light-tight seal between the tube and lantern wall.

FIGS. 7, 8 and 9 show another construction for telescopic optical tube 100A which is similar to tube 100 and corresponding parts are identically numbered. In this tube, tube section 102a is formed with four circumferentially spaced lugs 150 at one end and four other lugs 152 at the other end. The lugs 152 are offset from the lugs 150 axially of the tube section. Outer tube section 104a has circumferentially spaced inwardly extending projections 152 at its inner end. These projections can be engaged on lugs 150 as shown in FIG. 9 to hold the tube section 104a retracted on tube section 102a. By turning the tube section 102a slightly, the projections 154 will be disengaged from lugs 150 but will be stopped by lugs 152 as the tube section moves outwardly under pressure of the compressed spring 105. This engagement of projections 154 with lugs 152 is shown in FIG. 8. Cup 108 on the outer end of tube 100A accommodates to different angular relative positions of the tube 100A and the adjacent wall 120 of lantern globe 125 in the same manner as described in connection with FIGS. 4 and 5.

When the tube section 104a is retracted it will be held by engagement with lugs 150. This is accomplished by turning the tube section 104 slightly in one direction so that projections 154 pass lugs 150 and then turning the tube section slightly in opposite direction to engage the projections on the lugs.

FIGS. 10 and 11 show another telescopic optical tube 100B in which inner fixed tube section 102b has an external screw thread 160. Outer tube section 104b has an internal thread 162 which engages with thread 160. Other parts of tube 100B corresponding to those of tubes 100 and 100A are identically numbered. In this tube arrangement, cup 108 is shown conforming to the curved wall 120a of another lantern globe 25a to form a light-tight seal. In this tube arrangement, tube section 102a is held stationary while tube section 104b is screwed in one direction to move axially outward until the cup 108 abuts the inside of wall 120a. Flange 106 turns in the groove 107' in cup end 107 while the tube section 104b is screwed out fully to complete the light-tight seal between the cup and lantern wall. Retraction of tube section 104b is accomplished by holding the tube section 102b stationary while section 104b is turned in a direction opposite from the previously mentioned one direction.

In all forms of the telescopic tube, there are provided means for holding the outer tube section extended to complete a light-tight seal, and for holding the outer tube section retracted while the adapter is being turned to orient the cell 36 in optimum direction. All telescopic tubes have soft sealing cups at their outer ends. If desired the tubes 102, 102a and 102b can be located outside of tubes 104, 104a and 104b respectively. If the tube 102b is outside of tube 104b, then the positions of screw threads 160, 162 will be reversed, with thread 160 inside tube section 102a and with thread 162 outside tube section 104b. If tube 102a is outside of tube 104a lugs 150 and 152 will extend inwardly of tube 102a and projections 154 will extend outwardly of tube 104a. Other modifications will readily occur to those skilled in the art, without departing from the invention as defined by the appended claims.

What is claimed and sought to be protected by Letters Patent is:

1. A photoelectric switch adapter for a lantern having a globe with a transparent wall and a socket for receiving a lamp bulb inside the globe; said adapter comprising a housing having a generally cylindrical hollow body with tubular axial extensions at opposite ends, said body having a lateral opening with a radial extending tubular flange at said opening, a photoelectric cell in said body exposed at said opening to ambient light, a threaded ring on one tubular extension of the body for engaging in said socket, another threaded ring inside the other tubular extension for receiving the threaded end of a lamp bulb, and a telescopic tube having a first tubular section engaged on said flange and a second tubular section slidably engaged with said first tubular section.

2. A photoelectric switch adapter as recited in claim 1, further comprising means for holding the second tubular section retracted with respect to the first tubular section to permit rotational adjustment of said housing on said socket.

3. A photoelectric switch adapter as recited in claim 1, further comprisng a soft, resilient cup on the outer end of said second tubular section conformable to said wall of the globe regardless of the axial position of said tube with respect to said wall and regardless of the shape of said wall of the globe, and means for holding the second tubular section extended from said body to effect a light-tight seal between said cup and said wall of the globe to exclude light from said lamp bulb while admitting ambient light from outside of said globe to the photoelectric cell.

4. A photoelectric switch adapter as recited in claim 1, further comprisng a spring biased retracting tip engaged at said first tubular extension and constrained to axial movement only, for contacting a central contact in said socket, for preventing axial vibration of the housing with respect to said socket, and for preventing rotation of the housing with respect to the socket.

5. A photoelectric switch adapter as recited in claim 1, wherein said housing is composed of two similar mating semicylindrical shells secured together at abutted edges, and further secured together by the first named threaded ring.

6. A photoelectric switch adapter as recited in claim 3, wherein said means comprises a coil spring on the tubular sections for holding the second tubular section extended with respect to the first tubular section to effect a light-tight seal between said cup and said wall of the globe to exclude light from said lamp bulb while admitting ambient light from outside of said globe to said photoelectric cell.

7. A photoelectric switch adapter as recited in claim 3, wherein said means comprises mutually engaging threads on said tube sections for holding the second tubular section extended with respect to the first tubular section to effect a light-tight seal between said cup and said wall of the globe to exclude light from said lamp bulb while admitting ambient light from outside of said globe to said photoelectric cell, and for holding the second tubular section retracted with respect to the first tubular section to permit rotational adjustment of said housing on said socket.

8. A photoelectric switch adapter as recited in claim 3, further comprising means for holding the second tubular section retracted with respect to the first tubular section to permit rotational adjustment of said housing on said socket.

9. A photoelectric switch adapter as recited in claim 8, wherein the last named means is a removable member seated in an outer one of the tubular sections and engageable with the inner one of the tubular sections.

10. A photoelectric switch adapter as recited in claim 8, wherein the last named means comprises at least one radially extending lug on one of the tubular sections, and at least one radially extending projection on the other tubular section, said projection being engageable with said lug to hold the second tubular section retracted with respect to said housing, whereby angular rotation of said other tubular section disengages said projection from said lug to permit outward axial extension of said second tubular section with respect to the housing and first tubular section.

References Cited

UNITED STATES PATENTS

| | | | |
|---|---|---|---|
| 2,978,591 | 4/1961 | Ringger | 250—239 |
| 3,056,035 | 9/1962 | Bernheim | 250—239 |
| 3,093,744 | 6/1963 | Tabet | 250—239 |
| 3,163,768 | 12/1964 | Bernheim | 250—238 |

JAMES W. LAWRENCE, *Primary Examiner.*

V. LAFRANCHI, *Assistant Examiner.*

U.S. Cl. X.R.

339—147